CHLOROFLUOROPHENOXYALKANOLS AND ESTERS THEREOF

Everett E. Gilbert, Morris Township, Morris County, N.J., and Christ N. Yiannois, Los Angeles, Calif., assignors to Allied Chemical Corporation, New York, N.Y., a corporation of New York
No Drawing. Filed July 16, 1958, Ser. No. 748,829
6 Claims. (Cl. 260—458)

This invention relates to 2(2-chloro-4-fluorophenoxy) ethanol-1, 4(2-chloro-4-fluorophenoxy) butanol-1, and the esters thereof. The invention lies in the discovery of these compounds as new products, and the discovery of herbicidal properties of the same.

The compound 2(2-chloro-4-fluorophenoxy) ethanol-1 may be represented by the formula

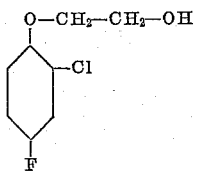

and the compound 4(2-chloro-4-fluorophenoxy) butanol-1 may be represented by the formula

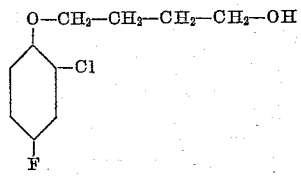

In accordance with the invention, it has been found that by procedure involving reacting a metallic chlorofluoro phenate and ethylene chlorohydrin under certain conditions, the new product 2(2-chloro-4-fluorophenoxy) ethanol-1 may be made in good yields. The following illustrates manufacture of such product by the indicated reaction.

Example A.—2-chloro-4-fluorophenol (43 gms.—0.34 mol) was added to a solution of sodium (6.0 gms.—0.33 mol) in absolute methanol. The mixture was heated at temperature of about 65° C. for about 30 minutes. Ethylene chlorohydrin, $C_2H_5OCl$, (24.5 gms.—0.3 mol) was added dropwise, and the resulting mass was heated at temperature of about 65° C. under refluxing conditions for 16 hours. A precipitate formed during the reaction. At the end of the heating period, the precipitate was filtered out and determined to be sodium chloride. The filtrate was then distilled, and there were recovered unreacted chlorohydrin, unreacted 2-chloro-4-fluorophenol, and 20 gms. of a product condensate boiling at 160° C. at 18 mm. mercury pressure, at 165° C. at 25 mm. pressure. The product is a colorless liquid, sparingly soluble in water but soluble in organic hydrocarbon solvents. Chlorine content was 18.5% (weight) by analysis, as compared with 18.7% theoretical. The product is a light-yellow, sweet-smelling oil having the sweet odor characteristic of ethers, and none of the strong phenolic odor. The product forms esters with acids with evolution of about the theoretical quantity of water, thus showing the presence of a hydroxyl group.

Another run carried out under substantially the same conditions except ethylene chlorohydrin and the sodium phenate were employed in about a 2:1 molar proportion gave a yield of 87.5% of theory of the final product.

In accordance with the invention, it has been found that 4(2-chloro-4-fluorophenoxy) butanol-1 may be made by reducing 4(2-chloro-4-fluorophenoxy)-butanoic acid to the corresponding butanol, for example by reacting the butanoic acid with a metal hydride. 4(2-chloro-4-fluorophenoxy)-butanoic acid may be prepared by procedure involving reaction of metallic phenoxides with butyrolactone. Thus, sodium 2-chloro-4-fluoro-phenate is reacted with butyrolactone to form the sodium salt of 4(2-chloro-4-fluorophenoxy)-butanoic acid, which salt is then acidified to the free acid, as illustrated by the following example.

Example B.—105 parts of 2-chloro-4-fluorophenol were added to a solution of 16.5 parts of sodium metal in about 157.8 parts of absolute ethanol, maintained in a reaction vessel provided with a reflux condenser and a stirrer. After stirring for a brief period, 61.7 parts of butyrolactone were added, and the mixture was refluxed at about 80° C. for 24 hours. The ethanol was then distilled out of the reaction mixture by heating the mixture to about 100° C. The residue was dissolved in water and acidified with hydrochloric acid, thereby precipitating a brown amorphous, crystalline solid. The crystalline solid was dissolved in benzene, treated with activated carbon and finally precipitated with petroleum ether as white crystals. After filtering off the white crystals and drying at about 40° C., 57 parts of material identified as 4(2-chloro-4-fluorophenoxy)-butanoic acid were obtained. Yield was 34% of theory. This compound is sparingly soluble in water and organic hydrocarbon solvents, melts at 92–95° C. and had a neutral equivalent of 229.5 as compared with 232.5 of theory. This compound is further described and claimed in our copending application Serial No. 748,787, filed of even date and now U.S. Pat. No. 3,005,695.

The following example illustrates production of the chlorofluorophenoxy butanol of the invention by reduction of the butanoic acid.

Example C.—23 gms. (0.1 mol) of 4(2-chloro-4-fluorophenoxy)-butanoic acid, prepared as detailed in Example B, were slurried in 200 ml. of anhydrous ethyl ether. This slurry was then added slowly to an ethereal slurry of 5 gms. (0.13 mol) lithium aluminum hydride with cooling at 0 to 5° C. over a period of about 30 minutes. After addition, the mixture was refluxed for about an hour at 35° C. following which the reaction mixture was diluted with water and acidified with aqueous sulfuric acid. The ether layer was then dried over anhydrous sodium sulfate, and the ether was removed by distillation to recover 20 gms. of reaction product as a viscous oil remaining in the still. Analysis of this crude product showed 14.2% chlorine, as compared with theory of 16.3%. Infrared analysis shows the absence of carboxyl group indicating that no starting material remained, and shows the presence of an ether linkage, a benzene ring, and a hydroxyl group all demonstrating formation of the butanol. Yield was about 95% of theory. Vacuum distillation of this crude product gives a sparingly water-soluble colorless oil boiling in the range of 141–148° C. at pressure in the range of 1.5–2.5 mm. of Hg. One gram of the foregoing product was dissolved in 30 mls. of petroleum ether, and 0.6 g. of 4-chlorophenylisocyanate was added. The resulting mixture was heated 30 minutes on a steam bath, cooled, and filtered to recover the solid product. Recrystallization gave 0.4 g. product melting at 59.5–61.5° C., i.e., the 4-chlorophenylurethane. Analysis of this product gave—

| | Theo. | Found |
|---|---|---|
| Fluorine | 5.1 | 5.5 |
| Carbon | 54.9 | 55.2 |
| Hydrogen | 4.3 | 4.4 | thus establishing that the material reacted with the 4-chlorophenylisocyanate was 4(2-chloro-4-fluorophenoxy) butanol-1.

As indicated, the invention also includes any ester of the above chlorofluorophenoxy ethanol and butanol. More particularly desirable are the mono esters of the ethanol and butanol, especially of the ethanol. The alkali metal sulfates, particularly of the ethanol, have been found to be notably effective.

The sulfates may be represented by the formula

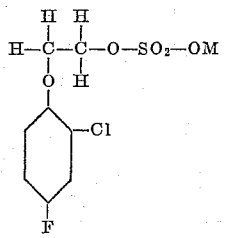

in which M may be an alkali metal such as sodium or potassium, an alkaline earth metal such as calcium or barium, and the ammonium and organic amine salts such as triethanol amine or triethylamine.

It has been found, in accordance with the invention, that alkali metal 2(2-chloro-4-fluorophenoxy) ethyl sulfate may be made by reacting the above described chlorofluorophenoxy ethanol with chlorosulfonic acid, reactions proceeding in accordance with (A) 

and (B) 

typically as follows:

*Example D.*—21.8 gms. (0.11 mol) of 2(2-chloro-4-fluorophenoxy) ethanol-1, made in accordance with Example A, were dissolved in 25 ml. of chloroform which solution was added to 0.1 mol chlorosulfonic acid dissolved in 50 ml. of chloroform with cooling and stirring. After addition, the reaction mixture was heated to 60° C. for 30 minutes, HCl being driven off. 50 ml. of cold water were added, and the resulting aqueous layer, consisting of the product of reaction (A) was carefully neutralized with aqueous sodium hydroxide to effect reaction (B). The resulting water solution was then evaporated to recover a solid product, which was purified by washing with acetone and drying, and identified as sodium 2(2-chloro-4-fluorophenoxy) ethyl sulfate. The 22 gms. of product recovered corresponded to a yield of 75% of theory.

*Example E.*—The trichloroacetic acid ester of the chlorofluorophenoxy ethanol, represented by the following formula, may be made as follows:

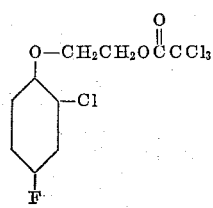

About 25 g. (0.13 mol) of the above ethanol, 23 g. (0.14 ml.) of trichloroacetic acid and about 150 ml. of toluene were placed in a 3-necked, stirred reaction flask, and refluxed at about 110° C. for 6.5 hrs., during which time 2.2 ml. water were collected in a Dean-Stark apparatus. For production of the trichloroacetic acid ester, theory water recovery is 2.3 ml. The reaction mixture was then distilled at pot temperature of about 170° C. and 36 gms., 82% of theory, of a liquid boiling at 151–158° C. at 3 mm. of Hg pressure were recovered as condensate and identified as the trichloroacetic acid ester. This material is a light yellow liquid, insoluble in water but soluble in organic solvents such as acetone and xylene.

*Example F.*—The 2,2-dichloropropionic acid ester of the ethanol, represented by the following formula, may be made as follows:

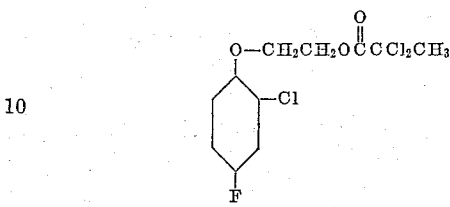

Procedure was substantially the same as in Example E, except that 0.5 gm. of toluene sulfonic acid was added as catalyst. Water obtained was about theoretical (2.3 mls.). 32 gms. (78% yield of theory) of liquid, boiling at 150–154° C. at 3 mm. of Hg were recovered, identified as the 2,2-dichloropropionic acid ester. This material is a light yellow liquid, sparingly water soluble, and soluble in organic hydrocarbon solvents such as acetone and xylene.

*Example G.*—The benzoic acid ester of the ethanol, represented by the following formula, may be made as follows:

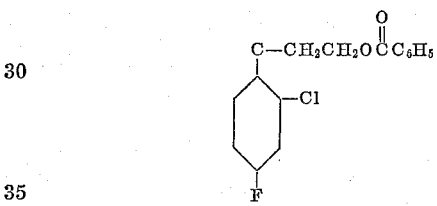

About 17 gms. (0.09 mol) of the ethanol product of Example A were dissolved in 150 ml. of benzenee containing about 7.9 gms. (0.1 mol) of pyridine. The solution was cooled to 2–3° C. and 13 gms. (0.09 mol) of benzoyl chloride were added with stirring at below 5° C. The mixture was allowed to come to room temperature, was stirred for 3 hours, and then allowed to stand overnight at room temperature. The solid pyridinium chloride was removed by filtration. The solvent was then removed by distillation. The residue product is semisolid at this point. Purification of the product was effected by dissolving in benzene and drowning in hexane. On filtration, 22 gms. (84% of theory) of a light tan solid, having a melting point of 58–62° C. was recovered. This material is water insoluble, soluble in organic solvents such as acetone and xylene, and of the following characteristics:

| | Theo. | Found |
|---|---|---|
| Saponification number | 190 | 185 |
| Carbon | 61.2 | 61.5 |
| Hydrogen | 4.1 | 4.3 |

*Example H.*—The phosphite ester of the ethanol, represented by the following formula, may be made as follows:

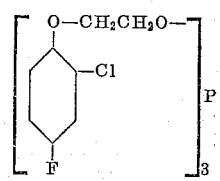

15 gms. (9.08 mols) of the ethanol of Example A were dissolved in ether containing 7.9 gms. (0.1 mol) of pyridine. An ether solution containing 3.5 gms. (0.03 mol) of phosphorus trichloride was added slowly below 5° C., stirred 1 hr. and allowed to come to room temperature.

After stirring for 3 hrs. at room temperature, the pyridinium chloride was filtered off. The solvent was removed in vacuo, and then the reaction mixture was heated to 150° C. at 4 mm. Hg pressure to remove a small quantity of unreacted starting material. 12.5 gms. (79% of theory) of viscous liquid material, identified as the above phosphite ester, were recovered as pot residue. This material is water insoluble, and soluble in organic solvents such as acetone, ether and xylene.

*Example J.*—The acetic ester of the butanol, represented by the following formula, may be made as follows:

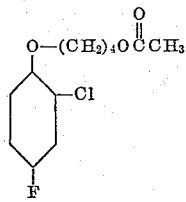

Procedure involves two steps represented by

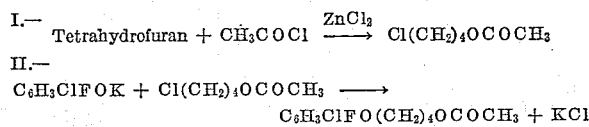

II.—
$C_6H_3ClFOK + Cl(CH_2)_4OCOCH_3 \longrightarrow$
$C_6H_3ClFO(CH_2)_4OCOCH_3 + KCl$ Step I was carried out in accordance with known art, J. Am. Chem. Soc. 61, 2667 (1939), and step II was carried out as follows:

2-chloro-4-fluorophenol (50 gms. —0.34 mol), potassium hydroxide (19.1 gms. —0.34 mol) and 200 ml. of xylene were refluxed with stirring and azetropic removal of 6.5 ml. of water to form the anhydrous potassium phenate. Then, 54 gms. (0.36 mol) 4-chlorobutyl acetate were added with stirring at 120° C. Refluxing at 145° C. was continued for nearly 7 hours. The mass was cooled to room temperature, the potassium chloride filtered out, and the xylene filtrate was washed with 5% aqueous HCl. Removal of xylene by distillation left 73.3 gms. of residual oil. Vacuum distillation of the latter gave 45.8 gms. (51.7% of theory) of a yellow oil boiling at 132–135° C. at 0.6 mm. Hg pressure. Infra-red analysis showed the presence of an ether linkage and a carbonyl group. Saponification number for the acetate of 4(2-chloro-4-fluorophenoxy)-butanol is 215 theory; found 216.

Saponification of the foregoing yellow oil product resulted in formation of 4(2-chloro-4-fluoro-phenoxy)-butanol and $CH_3COOK$. Procedure was as follows:

130.0 gms. (0.5 mol) of the yellow oil (the acetate) and 44.8 gms. (0.8 mol) of potassium hydroxide in 95% ethanol (about 550 ml.) were refluxed for 2.5 hrs. The mixture was then drowned in 1200 ml. of water and ether extracted. The ether was removed by distillation, giving 125 gms. residue. Vacuum distillation gave 101 gms. (92.3% yield) of colorless oil boiling in the range of 141–148° C. at pressure in the range of 1.5–2.5 mm. of Hg, and infrared spectrographic analysis showed the presence of a hydroxyl group, an ether linkage, a benzene ring and absence of a carbonyl group, i.e. the 4(2-chloro-4-fluorophenoxy)-butanol product of Example C.

*Example K.*—The benzoic ester of the butanol, represented by the following formula, may be made as follows:

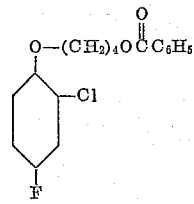

The above procedure used in Example J for preparation of the acetate was followed substantially the same to make the benzoate. The first step involved reaction of benzoyl chloride with tetrahydrofuran using $ZnCl_2$ catalyst. The second step comprised reaction of 4-chlorobutyl benzoate with potassium 2-chloro-4-fluoro-phenate as before. Evaporation of the xylene gave 121.7 gms. of crude residual oil. Vacuum distillation of the latter resulted in recovery of 64 gms. (59.3% of theory) of a viscous slightly yellow oil boiling at 202–204° C. at 1.5 mm. Hg pressure, and identified by infrared analysis to be the benzoate of 4(2-chloro-4-fluorophenoxy) - butanol. Saponification number of the benzoate of 4(2-chloro-4-fluorophenoxy)-butanol theoretically is 174; found 177.

As indicated above, the compounds of the invention have been found to possess marked herbicidal properties, particularly so with regard to the chlorofluorophenoxy ethanol, its alkali metal sulfate, and the butanol. The compounds of the invention afford control of broad leaf or dicotyledonous varieties of plants such as smartweed, rape, lamb's-quarters, bindweed, horsenettle and Canada thistle, which commonly grow wild in agricultural and other soils, and also control the more pernicious monocotyledonous plants or grasses such as ryegrass, foxtail, crabgrass and nutgrass.

The herbicides of the invention may be applied directly to the locus to be treated. However, for reasons of economy and uniformity of application, it is preferred to incorporate the active ingredient in liquid or solid diluents, and apply the active ingredient as a solution in a solvent or as a dispersion in a dispersing medium. The liquid diluent may be a solvent for the active ingredient or the active ingredient may be dispersed in the liquid diluent. Known solvents, diluents, emulsifiers, carriers, etc. may be employed as customarily in this art. For example, the ethyl sulfate is soluble in water and may be formulated as concentrated or dilute solutions in water. The ethanol and butanol, being sparingly soluble in water but soluble in organic hydrocarbon solvents, may be formulated as emulsifiable concentrates and dilute solutions in organic hydrocarbon solvents such as fuel oils, petroleum naphthas, etc. The solutions or dispersions may contain the active ingredient in an amount not less than ½ of a pound per 100 gallons of dispersion or solution, the more usual concentrations being in the range of 1 to 2 pounds per 100 gallons of dispersion or solution. The active ingredients may be impregnated on a suitable solid diluent. Typical diluents, which may be in finely divided or granular form, include diatomaceous earth, wood flours and silica gels. The dusts may contain as little as about 0.5% by weight of active ingredients. Various conventional wetting, dispersing and emulsifying agents may be added to the herbicidal formulations of the type described in order to enhance the wetting effect and produce improved dispersion of the active ingredient on the vegetation to which it is applied. Any of the known types of spraying or dusting apparatus may be employed for applying the herbicide to the soil or vegetation to be treated, a primary consideration being uniformity of application.

The herbicides of the present invention are applied to the area to be treated in amount (pounds per acre) sufficient to afford the degree of control of vegetation desired in the given area. The optimum intensity of application of the desired herbicide will depend on such factors as amount of vegetation in the area, degree of permanency of plant eradication desired, type of plants growing in the area, and climatic conditions. Hence, as is well known to those skilled in the art, the rate of application actually used will depend largely on prevailing local conditions. In most instances, effective control of germinating weed seeds and small weed seedlings may be realized by applying the herbicide at an over-all rate greater than about 1 pound per acre. Where prolonged nonselective control of established vegetation is desired, dosages greater than about 4 pounds per acre may be employed.

*Example 1.*—The following illustrates the herbicidal activity of the sodium 2(2-chloro-4-fluorophenoxy) ethyl sulfate of the invention. Data noted were the results of pre-emergence greenhouse tests carried out by the macro screening technique as described by Shaw and Swanson (Weeds, vol. I, No. 4, p. 352, July 1952). Compound A was the sodium 2(2-chloro-4-fluorophenoxy) ethyl sulfate of the invention, and Compound B was sodium 2(2,4-dichlorophenoxy) ethyl sulfate, a commercial herbicide. Quantities of active ingredients used were 4 and 8 pounds per acre made up to 40 gal. water solutions per acre for spraying purposes. Test plot crops were corn and soybeans, and ryegrass was considered as representative of grassy weeds, and rape representative of broad-leaf weeds.

|  | Cpd. A | | Cpd. B | |
| --- | --- | --- | --- | --- |
| Dosage, Lbs./Acre | 4 | 8 | 4 | 8 |
| Corn: | | | | |
| IR | 1 | 1 | 0 | 0 |
| Percent HR | 0 | 3 | 3 | 0 |
| Percent K | 0 | 4 | 0 | 0 |
| Soybeans: | | | | |
| IR | 3 | 4 | 5 | 7 |
| Percent HR | 40 | 35 | 17 | 35 |
| Percent K | 25 | 42 | 50 | 66 |
| Ryegrass: | | | | |
| IR | 2 | 6 | 0 | 2 |
| Percent K | 15 | 55 | 0 | 15 |
| Rape: | | | | |
| IR | 8 | 9 | 5 | 8 |
| Percent K | 75 | 90 | 50 | 80 |

IR=Injury Rating; 0=none, 1-3=slight, 4-6=moderate, 7-9=severe 10=kill.
HR=Height Reduction.
K=Kill.

Untreated checks: all figures zero.

It is noted that Compound A of the invention is considerably more active on both types of weeds than the corresponding 2,4-dichloro Compound B, a commercial herbicide. Compound A is only minimally injurious to corn, and less injurious to soybeans than Compound B. Accordingly, Compound A affords weed control in corn and soybeans superior to that of Compound B.

*Example 2.*—The following illustrates the herbicidal activity of the 2(2-chloro-4-fluorophenoxy) ethanol-1 and the 4(2-chloro-4-fluorophenoxy) butanol-1 compounds of the invention. Data noted are the results of greenhouse pre-emergence tests substantially the same as those of Example 1. Compound C was the 2(2-chloro-4-fluorophenoxy) ethanol-1 of the invention; Compound D was the 4(2-chloro-4-fluorophenoxy) butanol-1 of the invention; Compound E was 4(2-dichlorophenoxy) butanol-1, and Compound F was the dimethylamine salt of 4(2,4-dichlorophenoxy)-butanoic acid, a commercial herbicide. Quantities of active ingredients used were 2 pounds per acre made up for spraying purposes to 40 gal. acetone solutions per acre in the case of Compounds C and D, and made up to 40 gal. water solution per acre in the case of Compound F quantity of which was based on 100% active ingredient expressed as the free acid. Compound E was used at strength of 16 pounds per acre made up for spraying purposes to 40 gal. acetone solution per acre. Ryegrass is considered representative of grassy weeds and rape as representative of broad-leaf weeds.

|  | Percent plants killed or absent compared to untreated check plots | |
| --- | --- | --- |
|  | Broad-leaf Weeds | Grassy Weeds |
| Cpd. C | 98 | 98 |
| Cpd. D | 80 | 65 |
| Cpd. E | 30 | 20 |
| Cpd. F | 30 | 0 |
| Acetone (40 gal./acre check) | 0 | 0 |
| Untreated check | 0 | 0 |

These data demonstrate that under the pre-emergence test conditions indicated the chloro-fluoro ethanol and butanol compounds of the invention are remarkably active with respect to both types of weeds as compared with (a) 4(2,4-dichlorophenoxy) butanol-1 which has low herbicidal activity with respect to either type of weed even when applied in an eight times greater dosage strength, and (b) the commercial herbicide, the dimethylamine salt of 4(2,4-dichlorophenoxy) butyric acid, which compound has low activity as to broad-leaf and substantially no activity as to grassy type weeds.

*Example 3.*—The following illustrates herbicidal activity of other compounds of the invention. Data noted are the results of greenhouse pre-emergence tests similar to those of Example 1. Compound L was the trichloroacetic acid ester of the 2(2-chloro-4-fluorophenoxy) ethanol-1, i.e. the product of Example E; Compound M was the 2,2-dichloropropionic acid ester of the ethanol, i.e., the product of Example F; Compound N was the benzoic acid ester of the ethanol, i.e., the product of Example G; and Compound P was the phosphite ester of the ethanol, i.e., product of Example H. The 2,4-D was the dimethylamine salt of 2,4-dichlorophenoxyacetic acid, a commercial herbicide. Quantities of active ingredients used were, except for Compound P, 4 pounds per acre made up for spraying purposes to 40 gal. acetone solution per acre, and in the case of Compound P dosage was at the rate of 16 pounds per acre. Ryegrass is considered representative of grassy weeds and rape as representative of broad-leaf weeds.

|  | Percent weeds killed or absent compared with untreated check plots | |
| --- | --- | --- |
|  | Broad-leaf Weeds | Grassy Weeds |
| Cpd. L | 99 | 90 |
| Cpd. M | 85 | 65 |
| Cpd. N | 95 | 85 |
| Cpd. P | 100 | 99 |
| 2,4-D | 85 | 10 |
| Acetone—40 gal./acre check | 0 | 0 |
| Untreated check | 0 | 0 |

We claim:
1. A compound selected from the group consisting of 2(2 - chloro - 4 - fluorophenoxy) ethanol-1, 4(2-chloro-4-fluorophenoxy) butanol-1, and esters thereof selected from the group consisting of their acetic acid esters; their trichloroacetic acid esters; their dichloropropionic acid esters; their benzoic acid esters; their alkali metal monosulfates, and their triesters of phosphorous acid.

2. The compound 2(2 - chloro-4-fluorophenoxy) ethanol-1.

3. The compound sodium 2(2-chloro-4-fluorophenoxy) ethyl sulfate.

4. The compound 4(2-chloro-4-fluorophenoxy) butanol-1.

5. The benzoic acid ester of 2(2-chloro-4-fluorophenoxy) ethanol-1.

6. The acetic acid ester of 4(2-chloro-4-fluorophenoxy) butanol-1.

References Cited by the Examiner

UNITED STATES PATENTS 2,133,972 10/38 Coleman et al. _____ 167—24
2,140,824 12/38 Vernon _____ 260—613
2,158,957 5/39 Coleman et al. _____ 260—613
2,573,769 11/51 Lambrech _____ 71—2.6

(Other references on following page)

UNITED STATES PATENTS

| | | | |
|---|---|---|---|
| 2,626,227 | 1/53 | Lambrech | 260—613 X |
| 2,684,386 | 7/54 | Chiddix et al. | 260—613 |
| 2,726,946 | 12/55 | Mussell | 71—2.3 |
| 2,739,053 | 3/56 | Morrill | 260—613 X |
| 2,754,324 | 7/56 | Brust et al. | 260—613 |
| 2,828,198 | 3/58 | Harris et al. | 260—461 |
| 2,852,548 | 9/58 | Gundel et al. | 260—458 |
| 2,902,518 | 9/59 | Hurdis et al. | 260—613 |
| 2,904,421 | 9/59 | Seaton | 71—2.3 |

CHARLES B. PARKER, *Primary Examiner.*

LEON ZITVER, IRVING MARCUS, JOSEPH P. BRUST, *Examiners.*